United States Patent
Tegegne et al.

(10) Patent No.: US 9,800,994 B1
(45) Date of Patent: Oct. 24, 2017

(54) SYSTEMS AND METHODS FOR CLOUD-BASED DEVICE CONFIGURATION MANAGEMENT OF HETEROGENEOUS DEVICES

(71) Applicant: QUEST SOFTWARE INC., Aliso Viejo, CA (US)

(72) Inventors: Abel Tegegne, Ottawa (CA); Vineetha Abraham, Kanata (CA); Michel Albert Brisebois, Renfrew (CA)

(73) Assignee: QUEST SOFTWARE INC., Aliso Viejo, CA (US)

( * ) Notice: Subject to any disclaimer, the term of this patent is extended or adjusted under 35 U.S.C. 154(b) by 0 days.

(21) Appl. No.: 15/094,257

(22) Filed: Apr. 8, 2016

(51) Int. Cl.
*H04W 4/00* (2009.01)
*H04L 29/08* (2006.01)

(52) U.S. Cl.
CPC ............. *H04W 4/001* (2013.01); *H04L 67/10* (2013.01)

(58) Field of Classification Search
CPC ............................... H04W 4/001; H04L 67/10
See application file for complete search history.

(56) References Cited

U.S. PATENT DOCUMENTS

| | | | | |
|---|---|---|---|---|
| 8,065,561 B1* | 11/2011 | Vaikar | ................ | G06F 11/1415 714/15 |
| 2006/0047793 A1* | 3/2006 | Agrawal | ............ | H04L 41/0843 709/221 |
| 2009/0031008 A1* | 1/2009 | Elliott | ................ | H04L 61/1517 709/220 |
| 2012/0246291 A1* | 9/2012 | Wong | ................ | G06Q 30/0603 709/224 |
| 2015/0094093 A1* | 4/2015 | Pierce | ................... | H04W 64/00 455/456.3 |
| 2015/0319039 A1* | 11/2015 | Generozova | ........ | G06F 9/44505 709/220 |
| 2016/0344582 A1* | 11/2016 | Shivanna | ................ | H04L 41/04 |

OTHER PUBLICATIONS https://developers.nest.com/, printed Jun. 17, 2016 (10pgs).
https://developers.google.com/brillo/, printed Jun. 17, 2016 (4pgs).
http://nfctags.tagstand.com/, printed Jun. 17, 2016 (11 pgs).
http://iotags.com/industries/, printed Jun. 17, 2016 (3pgs).
http://nfc-forum.org/what-is-nfc/nfc-in-action/, printed Jun. 17, 2016 (2pgs).

(Continued)

*Primary Examiner* — Christopher M Brandt
(74) *Attorney, Agent, or Firm* — Maschoff Brennan

(57) ABSTRACT

The present disclosure provides for information handling systems and methods to configure and manage any number of heterogeneous devices. In various embodiments, a shared device configuration is simultaneously applied to a selected group of otherwise incompatible heterogeneous devices that may use different communication protocols and operating systems. Certain embodiments create and maintain a database of configuration and operational information that is accessible across platforms. A group device configuration may be automatically applied to all devices in the selected group via a batch command. Some embodiments allow independent heterogeneous devices that have similar functionality to have different device configuration settings.

20 Claims, 6 Drawing Sheets

(56) References Cited

OTHER PUBLICATIONS http://nfcring.com/, printed Jun. 17, 2016 (1 pg).
http://www.nfcworld.com/nfc-phones-list/, printed Jun. 17, 2016 (14pgs).
http://electronicdesign.com/embedded/understanding-protocols-behind-internet-things, printed Jun. 17, 2016 (11pgs).
http://embedded-computing.com/articles/internet-things-requirements-protocols/ #, printed Jun. 17, 2016 (11pgs).
https://nxp-rfid.com/products/ntag/ntag-i2c-benefits/, printed Jun. 17, 2016 (5pgs).

* cited by examiner

001

SYSTEMS AND METHODS FOR CLOUD-BASED DEVICE CONFIGURATION MANAGEMENT OF HETEROGENEOUS DEVICES

A. TECHNICAL FIELD

The present disclosure relates to information handling systems such as networking devices. More particularly, the present disclosure is related to systems and methods for improving the ease of interfacing with heterogeneous devices, such as various Internet-of-Things (IoT) devices.

B. DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Devices, such as IoT devices, typically need to be configured before they can be put to use. Configuration of heterogeneous devices may be performed manually by the end user or by sending configuration information to an interface of the device using some type of communication protocol (e.g., Wifi, ZigBee, Bluetooth, NFC, etc.) that is compatible with the device. However, device settings are usually lost after a hard (factory) reset. In addition, while configuration and operation of a single device is fairly straightforward, maintaining multiple configurations on multiple heterogeneous devices is currently not supported in the industry. In a large-scale IT network connecting possibly thousands of heterogeneous non-standardized network devices that use different communication protocols and operating systems, configuration management presents great challenges to installers and operators alike.

Existing IoT messaging protocols or methods, such as Nest, which exposes a Web API to store device configurations, support only those types of devices that have access to specific platforms (e.g., the Nest platform through the Firebase publish/subscribe mechanism). However, existing approaches do not provide solutions for supporting or managing heterogeneous devices that, for example, support only local (short range) wireless communication.

Therefore, it would be desirable to have information handling system and methods that allow to configure and manage groups of heterogeneous devices across heterogeneous platforms in a normalized fashion. It would further be desirable to have systems and methods that allow independent heterogeneous devices that have similar functionality to have different device configuration settings.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
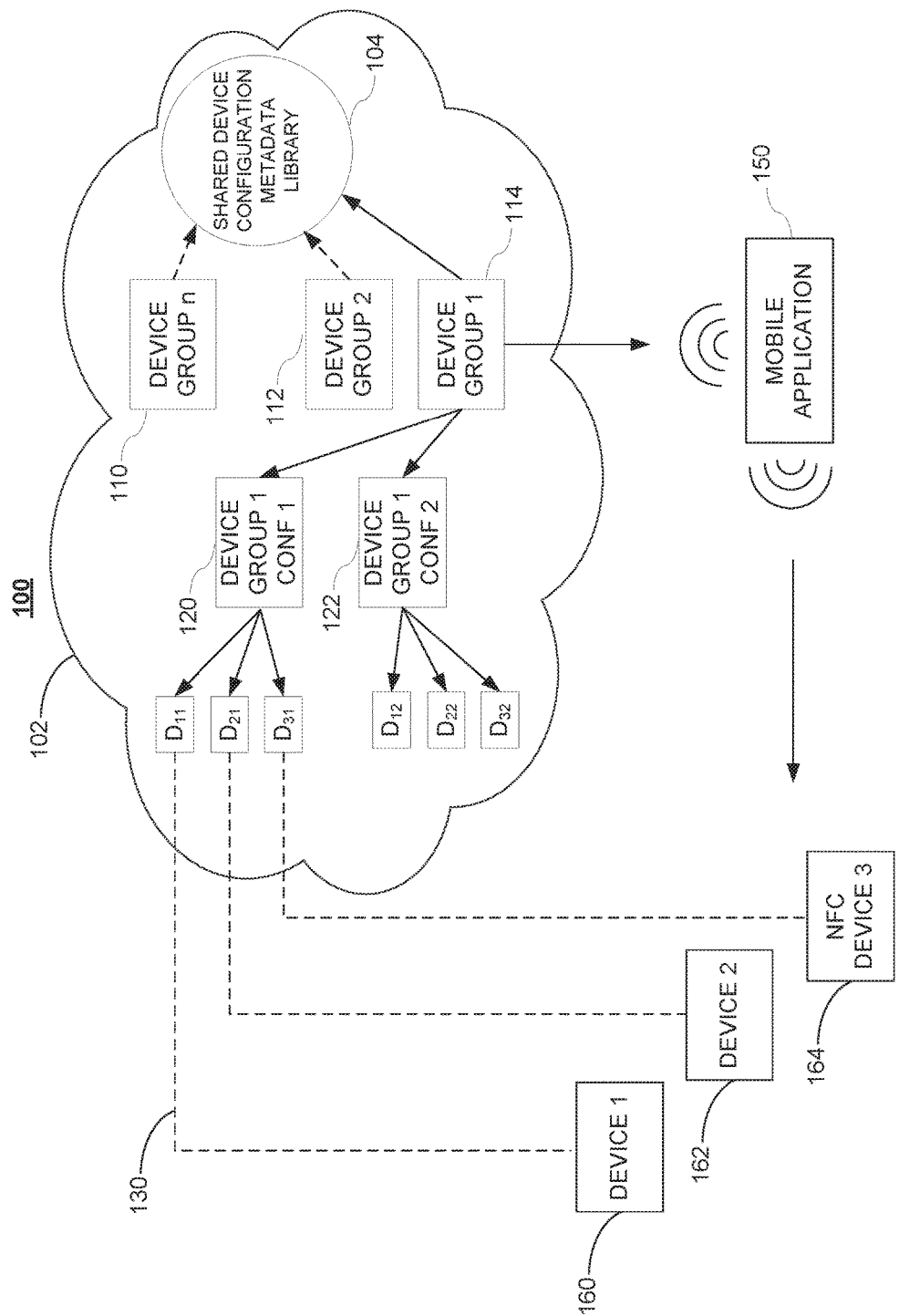
FIG. 1 illustrates an exemplary information handling system for managing device configurations of heterogeneous devices, according to various embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

The terms "data," "data traffic," "information," "cell," etc. may be replaced by other terminologies referring to a group of bits, and may be used interchangeably.

Furthermore, it shall be noted that: (1) certain steps may optionally be performed; (2) steps may not be limited to the specific order set forth herein; (3) certain steps may be performed in different orders; and (4) certain steps may be done concurrently.

FIG. 1 illustrates an exemplary system for managing device configurations of heterogeneous devices, according to various embodiments of the present disclosure. System 100 comprises cloud system 102, devices 160-164, and portable device 150. Cloud system 102 represents a system that stores network-related data and manages a number of heterogeneous devices 160-164, such as sensors and actuators. As used herein, the terms "heterogeneous device" and "network device" shall be understood to mean any device that may be communicated with via a wired connection, a wireless connection, or both; furthermore, a networked device may be one that is not always in communication. For example, a network device that communicates via a Near Field Communication (NFC) may only communicate with another device when it is within signal range. Devices 160-164 have access to and communicate with cloud system 102 via one or more communication channels 130 and one or more communication protocols such as Wifi. In embodiments, heterogeneous devices 160-164 register their information and exchange data (e.g., download updated configuration information) directly with cloud system 102. Devices 160-164 may further be designed to communicate with each other using any suitable communication protocol. Portable device 150 is any mobile device that communicates with cloud system 102, for example, a mobile phone that uses an application to coordinate communication between cloud system 102 and an end user. In embodiments, portable device 150 is designed to communicate with one or more devices 160-164 via relatively short range local wireless communication, such as Near Field Communication (NFC). One skilled in the art will appreciate that portable device 150 may be substituted with any other type of device that may serve as gateway device that enables communication between cloud system 102 and devices that support wireless communication.

Cloud system 102 may be implemented, for example, by any number of remote servers that may communicate with each other. In embodiments, cloud system 102 comprises database 104 that stores device-related data, such as device identification data, configuration information, metadata, and the like. Metadata may include any data that may be generated based on a similar or same type of device, such as data gathered from various network devices. For example, metadata may comprise pre-existing device attributes for a same or similar device type that was previously registered in network 100. Database 104 may further comprise a library that is accessible to any number of servers and heterogeneous devices 160-164. It is understood that devices 160-164 may be located in close physical proximity to one another or be distributed at various geographical locations.

In operation, portable device 150 receives from a user device-related data regarding device 160 (e.g., a device characteristic such as a device type) and communicates that information to cloud system 102, e.g., via an application. In embodiments, cloud system 102 acts as a centralized management tool that remotely stores and communicates device-related data to portable device 150. In addition to device configuration information, cloud system 102 may further store and distribute operational information about a network device or group of network devices, including hardware data, software/firmware data, schemata, network configuration, network dependencies, communication protocols, security protocols, etc.

In embodiments, the application receives from cloud system 102 metadata or shared schema information to pre-populate fields with suggested or default device configuration settings. In embodiments, pre-existing data that is based on previous usage may be reused and presented to a user at a user interface of a mobile application. Advantageously, reusing data and prepopulating fields greatly simplifies data entry for subsequent devices, as it reduces the amount of configuration data that would otherwise need to be specified in detail when registering or configuring a similar or same type of device 160. Sharing of pre-existing data assists a user in configuration management (e.g., to restore or retrieve historical configuration setting or value), promotes consistency between heterogeneous devices 160-164 (e.g., devices located at two different sites of the same enterprise), and aids in replicating a particular device configuration to heterogeneous devices 160-164. It is noted that configuration and other device-related data may be communicated machine-to-machine with no user involvement or end-user communication, for example, in instances where device 160-164 is a sensor that has no control interface and merely outputs measured data.

In embodiments, cloud system 102 analyzes previous device configurations, such as settings of independent users who operate a similar set of devices, and recommends an optimized device configuration setting for a specific type of device. In embodiments, analysis is based on an abstraction layer, as will be discussed further below with respect to FIG. 3 and FIG. 5.

Figure 2:
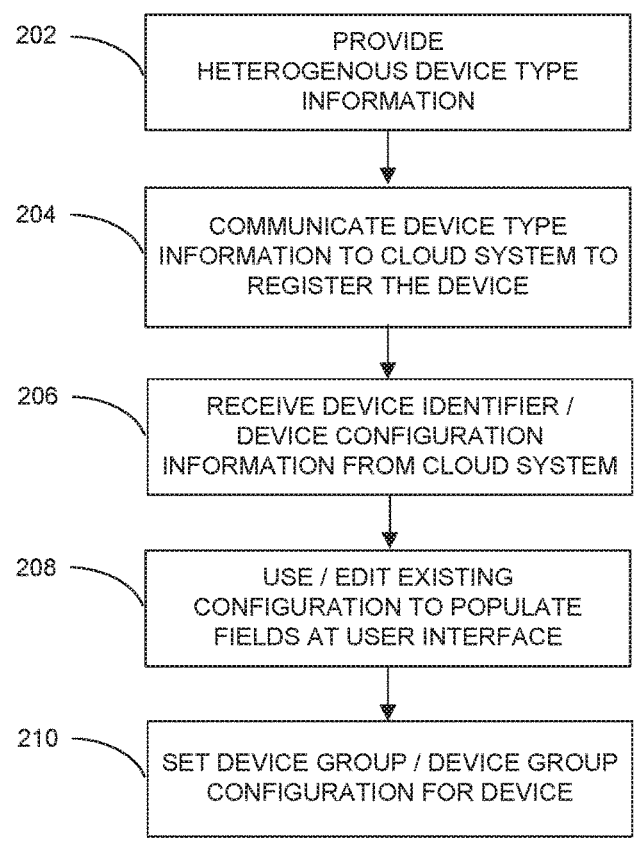
FIG. 2 is a flowchart of an illustrative process for registering an IoT device, according to various embodiments of the present disclosure.

In embodiments, in an initial registration phase, a user may sign up to cloud system 102 for managing configurations of heterogeneous devices 160-164 and use portable device 150 to install an application that may serve as a gateway to interact with devices 160-164. In embodiments, one or more devices 160-164 may support short range communication using a local communication protocol. The process for registering a specific device 160 is illustrated in flowchart in FIG. 2.

At step 202, the user provides device type information to a cloud system, for example, via an application that operates on a mobile device.

At step 204, the user or the device itself may send the device type information to the cloud system for further processing.

At step 206, the cloud system provides device-related data, such as updated device configuration data to the device, for example, via the application. In embodiments, the cloud system provides device identification information such as a unique alphanumeric number. In embodiments, a cloud-generated unique device ID may be assigned or over-ridden by the user.

At step 208, the device-related configuration data may be used to prepopulate fields in the application with existing configuration setting values to assist device configuration creation, e.g., if device configuration information that is entered by other users already exists. In embodiments, prepopulating fields may be used as a suggestion that a user may edit when creating configuration values for a newly registered device. Additional operational information about the device, such as hardware data, software/firmware data, schemas, network configuration, network dependencies, security protocols, communication protocols, and the like, may also be stored together with the device configuration.

At step 210, the device group and/or the device group configuration will be defined/set for the newly registered device. Device grouping and configuration for a group of devices enables the application of a configuration to a group of heterogeneous devices as a "single" operation. In embodiments, device grouping information and/or configuration values selected in step 208 are sent to the cloud system (for storage, future use in reconfiguration and/or analysis of any sort). Device groups are defined by the user in the cloud system or in the mobile device as part of a device configuration. A device, upon registration, may be added to a device group manually or automatically, based on its configuration setting values.

In embodiments, the cloud system provides a cloud-generated device identification for storage in an NFC tag that is associated with an NFC device. In embodiments, a unique device ID is written into a reprogrammable the NFC tag in response to a gesture, e.g., a tapping gesture, on a mobile phone. In embodiments, once an NFC-enabled device is registered, subsequent tapping actions may be used to initiate a local communication between the mobile device and the device (e.g., via Bluetooth), or retrieve information, such as historical configuration information.

Once a user enters device-specific configuration data into the application, the application may forward the data to the cloud system for further processing, storage, or retrieval of data stored in the cloud system, e.g., updated configuration data that may be used to trigger a device-specific action.

Returning to FIG. 1, in embodiments, based on device identifiers (e.g., identifiers stored in NFC tags) a user may combine one or more heterogeneous devices 160-164 into device groups 110-114 from which a selection of to-be-configured devices may be made and to which a particular configuration may be applied. Portable device 150 may communicate via a communication protocol with the selected group of devices to apply a desired device group configuration.

Heterogeneous devices 160-164 may be grouped by location (e.g., a living room, a security zone, etc.), by association with certain individuals (e.g., a person residing in a "smart home"), by use (e.g., in a particular section of a plant), by device attributes (e.g., existing or added unique device identifiers that maybe treated equally for grouping purposes), or in any other manner and combination thereof. In embodiments, grouping of devices 160-164 is performed automatically, for example via the application itself, or by cloud system 102. It is understood that any number of devices 160-164 may be connected to, removed from, or added to cloud system 102 to extend or adjust the size of the heterogeneous devices 160-164.

Once device configurations are created and device groupings are defined, a user may request a particular set of configurations to be applied to a particular set of devices. In embodiments, the user may select one or more of a number of group configurations 120-122 to be applied to one or more target devices associated with a particular group configuration 120-122. For example, during configuration management, a user may combine heterogeneous devices 160-164 into device group 114 and select device group configuration 120 to be applied to devices 160-164 that each may have different functionality (e.g., a thermostat, window blinds controller, and a lighting system).

In embodiments, a device group configuration setting may be simultaneously applied to all devices in a group, or a group configuration may be applied according to one or more rules or logic, for example, to accommodate a configuration sequence involving a delay. In embodiments, grouping is used to configure and manage heterogeneous devices in batches, e.g., when switching from one mode of operation to another, by providing user-adjustable templates that may be used to apply commands and settings to heterogeneous devices within a selected group, thereby, eliminating the need to adjust or configure each device in the group individually. As an example, based on a detected threat, a user may apply a device group configuration that increases or decreases a threshold for an alarm that is triggered to alert a user. As a result, individual heterogeneous devices' mode of operation may be adjusted according to a sensitivity or security level. As another example, a selected group of heterogeneous devices may be configured to switch between a summer configuration mode and a spring configuration mode. A person of skill in the art will appreciate that it is not necessary that all commands be compatible with all devices that receive a certain command.

In embodiments, cloud system 102 applies a set of configuration values or a device group configuration 120-122 to a selected group of devices (here device group 114) using communication protocols compatible with each respective device 160-164. In example in FIG. 1, cloud system 102 applies device group configuration 120 to devices 160-164. While only a limited number of heterogeneous devices 160-164 is shown in FIG. 1, it is understood that device configurations of any complexity, variety, and size may be propagated via cloud system 102 to be applied virtually simultaneously to any number of heterogeneous devices 160-164.

In embodiments, a user may initiate the application of a device group configuration received by portable device 150 to heterogeneous devices 160-164. For example, a user may approach a device at a sufficiently close distance to enable communication (e.g., via NFC) between portable device 150 and device 160. Further, the user may tap an NFC tag assigned to each such device to initiate an action, for example, to view an existing configuration or apply an updated configuration.

Figure 3:
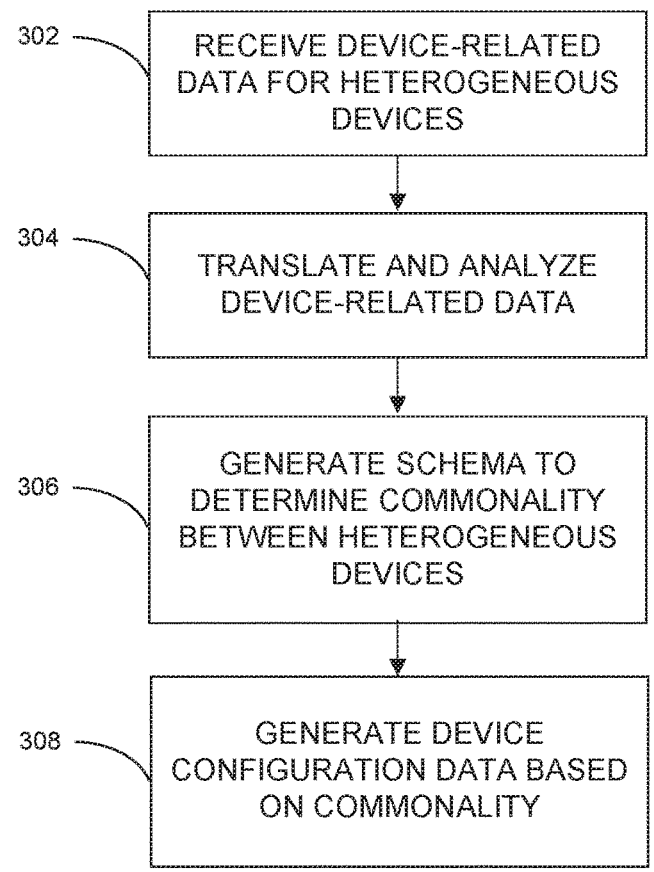
FIG. 3 is a flowchart of an illustrative process for generating a schema for managing device configuration data of heterogeneous IoT devices, according to various embodiments of the present disclosure.

FIG. 3 is a flowchart of an illustrative process for generating a schema for managing device configuration data of heterogeneous devices, according to various embodiments of the present disclosure. The process for generating the schema starts at step 302 when device-related data is received, e.g., from a user.

At step 304, the information may be forwarded to a cloud system for translation and analysis, for example, by using device abstraction discussed below with respect to FIG. 5.

At step 306, based on or as part of the analysis, a schema for determining a commonality between two or more heterogeneous devices is generated.

At step 308, based on the commonality, device configuration data for the heterogeneous devices is generated.

Figure 4:
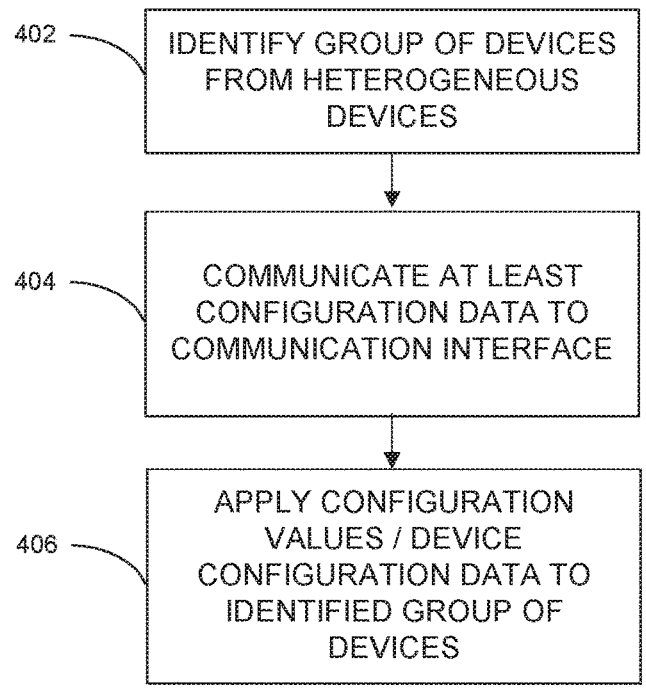
FIG. 4 is a flowchart of an illustrative process for using a schema to manage device configurations of heterogeneous IoT devices, according to various embodiments of the present disclosure.

FIG. 4 is a flowchart of an illustrative process for using a schema to manage device configurations of heterogeneous devices, according to various embodiments of the present disclosure.

At step 402, a group of devices to which a device configuration will be applied is identified from the heterogeneous devices.

In embodiments, at step 404, configuration data is communicated to a communication interface, e.g., an application on the mobile device. It is understood, that configuration data may comprise information about device groupings and/or device configuration groupings. In embodiments, configuration data may be provided by a user and communicated to the cloud system.

At step 406, the configuration values/device configuration data are applied to the group of devices. In embodiments, these configurations may be applied to all the devices in the group via the cloud system by using their respective communication protocol. For those devices that use local communication protocol, a user may tap the NFC tag that is assigned to the device to apply an updated configuration.

Figure 5:
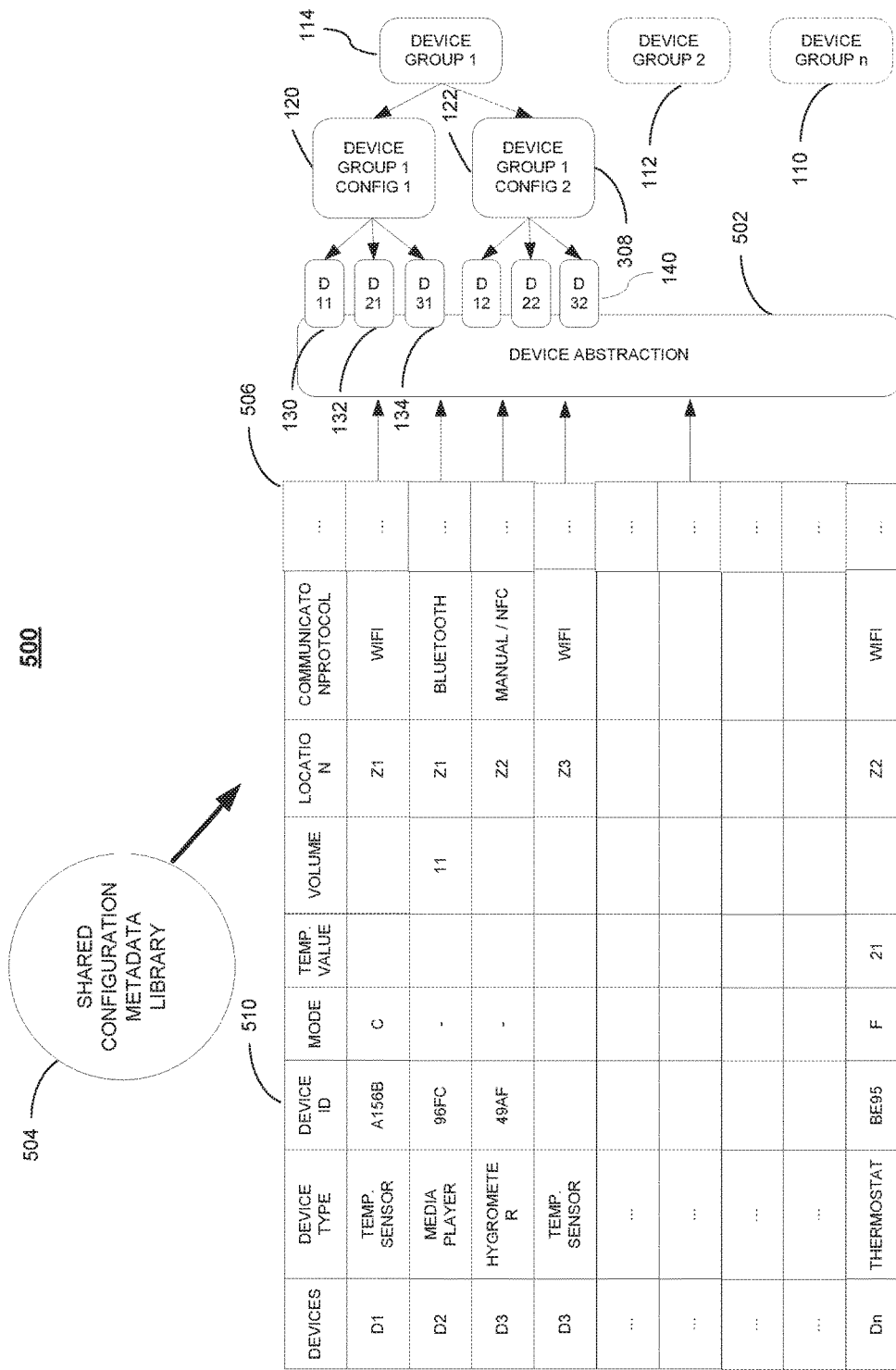
FIG. 5 illustrates an exemplary information handling system for managing device configurations using device abstraction, according to various embodiments of the present disclosure.

FIG. 5 illustrates an exemplary information handling system for managing device configurations using device abstraction, according to various embodiments of the present disclosure. System 500 comprises device 130, device abstraction layer 502, and database 504 that stores network-related data, for example, in a cloud system (not shown) that directly or indirectly communicates with and manages device 130. Device 130 is any network device discussed with respect to FIG. 1. In FIG. 5, device 130 is a temperature sensor device, device 132 is a media player device, device 134 is a hygrometer, etc. Each device 130 is assigned a unique device identification (ID) 510. In embodiments, if device 130 provides a native device ID 510, the ID is used to identify device 130 directly or indirectly (e.g., via a hash). Alternatively, i.e., if device 130 provides no native device ID, system 500 may provide a system-assigned ID that for storage within device 130, for example, in an NFC tag. In embodiments, multiple device IDs may be created for a single unit or device 130 that has numerous functionalities. As one example, device 130 may operate as both a thermostat and a hygrometer, at the same time.

In embodiments, device 130 is associated with device-related data such as attributes or features listed in table 506. Features in FIG. 5 comprise device ID, mode of operation, location, type of communication protocol, operational information, etc. Features may overlap with other devices having similar or same characteristic. Each feature may further be associated with other device-related data, such as a setting or device value. Exemplary device values for temperature, volume, location, etc. are depicted in FIG. 5. It is understood that any of this data may be stored and modified in database 504.

In operation, in embodiments, device-related data is obtained from individual heterogeneous devices 130-134, for example, upon registration. In embodiments, device 130 communicates with device abstraction layer 502 via a gateway device (not shown). Device abstraction layer 502 enables different types of configurations to be simultaneously propagated to different types of devices via differing communication protocols. In embodiments, abstraction layer 502 manages varying configurations for heterogeneous devices (e.g., network devices 130-134) at a single interface and performs tasks, such as automatically identifying and grouping similar device, for example, by type and location. In embodiments, identification and/or grouping is based on selected or common configuration settings that may be stored in database 504 that is shared between heterogeneous devices 130-134 and/or users. Any number of device group configurations 120-122 may be defined for a particular group. In embodiments, a user or system 500 (e.g., through an API) may switch between different device group configurations 120-122 or even between a single operation.

In embodiments, device groups are generated by using a database query of device-related attributes provided by device abstraction layer 502 (e.g., "All Temperature Sensors" or "Devices in a particular location [Zone1]"). A device that satisfies a query or device grouping criterion may be automatically assigned to or added to one or more groups. It is understood that device grouping may also be defined manually, e.g., upon registration.

In embodiments, device abstraction layer 502 identifies common features and combines them in a manner such that, at one level of abstraction, details of internal differences of similar types of devices and/or differences between heterogeneous devices do not disturb a query. In other words, abstraction layer 502 ensures that certain differences that may cause incompatibilities remain hidden, such that the overall appearance of heterogeneous devices is uniform. The result may be viewed as a standardization process that enables device abstraction layer 502 to identify and use a single configuration setting common to a potentially large number of otherwise incompatible devices.

In embodiments, abstraction layer 502 aids in translating device data into a format that allows configuration data to be extracted and analyzed. In embodiments, abstraction layer 502 is used to analyze data and create templates or schemas, or apply analyzed data to known templates. A template may include any type of device-related information, such as a basic device ID, a maintenance schedule, etc., and may be used to apply commands and setting to one or more devices at the same time. In embodiments, a common configuration setting is translated into a configuration setting that is compatible with a particular device before or at the time of applying the setting. The translation process may involve converting configuration data to a native format using a native communication protocol.

One skilled in the art will appreciate that, as part of the translation process, configuration setting values may be altered, removed, ignored, added, or split into multiple values. A person of skill in the art will further appreciate that abstraction layer 502 may communicate with a presentation layer or user interface (not shown) that allows for the selection of a group of devices (e.g., by device ID) and/or for the selection of configuration settings for the group.

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 6:
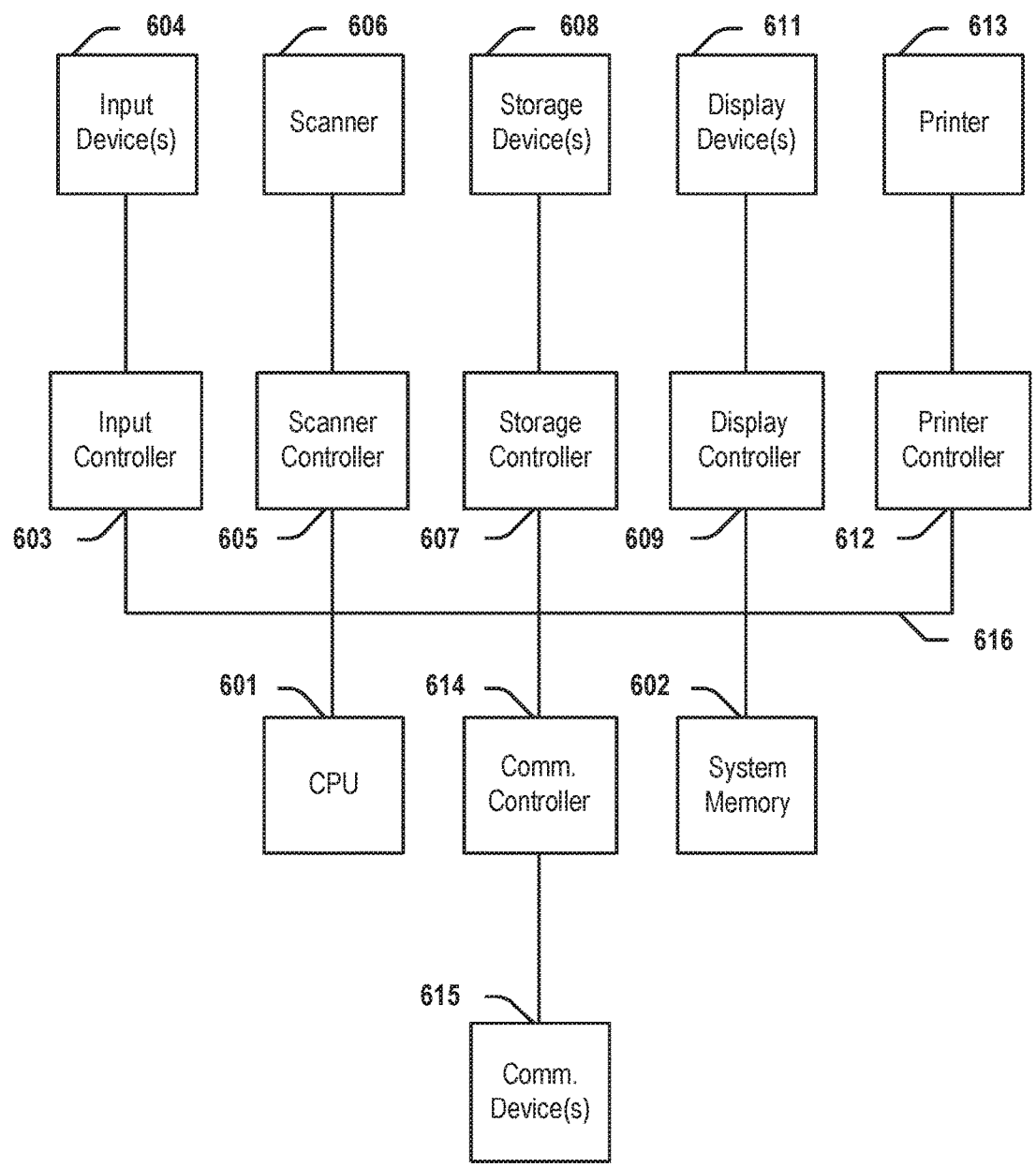
FIG. 6 depicts a block diagram of an exemplary information handling system according to embodiments of the present invention.

FIG. 6 depicts a block diagram of an exemplary information handling system according to embodiments of the present invention. It will be understood that the functionalities shown for system 600 may operate to support various embodiments of an information handling system—although it shall be understood that an information handling system may be differently configured and include different components. As illustrated in FIG. 6, system 600 includes a central processing unit (CPU) 601 that provides computing resources and controls the computer. CPU 601 may be implemented with a microprocessor or the like, and may also include a graphics processor and/or a floating point coprocessor for mathematical computations. System 600 may also include a system memory 602, which may be in the form of random-access memory (RAM) and read-only memory (ROM).

A number of controllers and peripheral devices may also be provided, as shown in FIG. 6. An input controller 603 represents an interface to various input device(s) 604, such as a keyboard, mouse, or stylus. There may also be a scanner controller 605, which communicates with a scanner 606. System 600 may also include a storage controller 607 for interfacing with one or more storage devices 608 each of which includes a storage medium such as magnetic tape or disk, or an optical medium that might be used to record programs of instructions for operating systems, utilities and applications which may include embodiments of programs that implement various aspects of the present invention. Storage device(s) 608 may also be used to store processed data or data to be processed in accordance with the invention. System 600 may also include a display controller 609 for providing an interface to a display device 611, which may be a cathode ray tube (CRT), a thin film transistor (TFT) display, or other type of display. The computing system 600 may also include a printer controller 612 for communicating with a printer 613. A communications controller 614 may interface with one or more communication devices 615, which enables system 600 to connect to remote devices through any of a variety of networks including the Internet, an Ethernet cloud, a Fiber Channel over Ethernet (FCoE)/Data Center Bridging (DCB) cloud, a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

The invention claimed is:

1. A system to manage heterogeneous devices, the system performing the steps of:
   receiving device-related data for heterogeneous devices, at least some of the devices having differing configuration settings;
   generating a schema by analyzing the device-related data to determine a commonality of a group of heterogeneous devices from the heterogeneous devices; and
   based on the commonality, generating device configuration data for the group of heterogeneous devices.

2. The system according to claim 1, wherein the schema transforms the device configuration data into a searchable format.

3. The system according to claim 2, wherein the commonality is based on at least one of a location and an association with an individual.

4. The system according to claim 2, wherein the schema considers user-selectable rules.

5. The system according to claim 4, wherein at least one rule is used to identify the commonality.

6. The system according to claim 1, wherein applying comprises using a portable device that establishes a communication to one or more of the heterogeneous devices.

7. The system according to claim 1, wherein the step of generating comprises grouping device configuration values associated with a group of heterogeneous devices.

8. A method to manage heterogeneous devices, at least some of the devices having differing configuration settings, the method comprising:
   identifying a group of devices from heterogeneous devices, the heterogeneous devices being analyzed by a schema that analyzes device-related data to determine a commonality at least between two heterogeneous devices that have different functionality and generates device configuration data for at least the two heterogeneous devices;
   communicating the configuration data to a communication interface that is coupled to a user interface and a cloud system; and
   applying at least one of a number of configuration values and some of the device configuration data to the group of devices.

9. The method according to claim 8, wherein the step of identifying is performed based on a database query.

10. The method according to claim 9, wherein the step of identifying comprises at least one of associating a device with the group of devices and removing a device from the group of devices.

11. The method according to claim 10, wherein the step of identifying is performed via an application.

12. The method according to claim 8, wherein based on the commonality, the schema is used to generate configuration metadata from the device-related data.

13. The method according to claim 12, wherein, in a registration phase, the configuration metadata is used to pre-populate at least one of the configuration values at the user interface.

14. A system for managing heterogeneous device configurations, the system comprising:
   one or more communication interfaces that facilitate data communication with a user device and with at least some of a set of heterogeneous devices;
   one or more processors;
   non-transitory computer-readable medium or media comprising one or more sequences of instructions which, when executed by at least one processor, causes steps to be performed comprising:
      receiving, via the one or more communication interfaces, device-related data from at least one of the user device and at least some of the set of heterogeneous devices;
      analyzing the device-related data to determine a commonality for a group of heterogeneous devices to generate device configuration data for the group of heterogeneous devices; and
      applying, based on the commonality, at least one of a number of configuration values and some of the device configuration data to at least some of the group of heterogeneous devices.

15. The system according to claim 14, wherein at least two of the heterogeneous devices differ in at least one of an operating platform and a communication protocol.

16. The system according to claim 14, further comprising the step of:
   providing to the user, via the one or more communication interfaces, a recommendation for a device configuration setting for a specific type of device based upon analyzing the device-related data.

17. The system according to claim 14, wherein the system determines the group of heterogeneous devices based on the commonality.

18. The system according to claim 14, wherein at least one of the heterogeneous devices in the group of heterogeneous devices cannot directly communicate via the one or more communication interfaces with the system and the system sends to the user device the at least one of the number of configuration values and some of the device configuration data for the user device to relay to the at least one of the heterogeneous devices.

19. The system according to claim 18 wherein the at least one of the number of configuration values and some of the device configuration data that is sent to user device to relay to the at least one of the heterogeneous devices is configured to be communicated via a short range communication interface.

20. The system according to claim 19, wherein the short range communication interface is a Near Field Communication tag.

* * * * *